United States Patent
Chen et al.

(10) Patent No.: US 12,432,373 B2
(45) Date of Patent: Sep. 30, 2025

(54) METHOD AND APPARATUS FOR HARDWARE-FRIENDLY TEMPLATE MATCHING IN VIDEO CODING SYSTEM

(71) Applicant: MEDIATEK INC., Hsinchu (TW)

(72) Inventors: Chun-Chia Chen, Hsinchu (TW);
Olena Chubach, San Jose, CA (US);
Chih-Wei Hsu, Hsinchu (TW);
Tzu-Der Chuang, Hsinchu (TW);
Ching-Yeh Chen, Hsinchu (TW);
Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 24 days.

(21) Appl. No.: 18/684,787

(22) PCT Filed: Aug. 18, 2022

(86) PCT No.: PCT/CN2022/113410
§ 371 (c)(1),
(2) Date: Feb. 19, 2024

(87) PCT Pub. No.: WO2023/020591
PCT Pub. Date: Feb. 23, 2023

(65) Prior Publication Data
US 2024/0357153 A1    Oct. 24, 2024

Related U.S. Application Data

(60) Provisional application No. 63/234,739, filed on Aug. 19, 2021.

(51) Int. Cl.
*H04N 19/513* (2014.01)
*G06V 10/75* (2022.01)
(Continued)

(52) U.S. Cl.
CPC ......... *H04N 19/513* (2014.11); *G06V 10/751* (2022.01); *H04N 19/139* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 1,043,285 | A | 11/1912 | Zika |
| 6,043,838 | A | 3/2000 | Chen |

(Continued)

FOREIGN PATENT DOCUMENTS

| | | |
|---|---|---|
| CN | 108781295 A | 11/2018 |
| TW | 426835 B | 3/2001 |
| TW | 201817235 A | 5/2018 |

OTHER PUBLICATIONS

International Search Report and Written Opinion dated Nov. 17, 2022, issued in application No. PCT/CN2022/113410.

(Continued)

*Primary Examiner* — Christopher G Findley
(74) *Attorney, Agent, or Firm* — McClure, Qualey & Rodack, LLP

(57) ABSTRACT

Method and apparatus for template matching with a determined area are disclosed. According to this method, a current template comprising current neighbouring pixels on an above side of the current block, on a left side of the current block, or a combination thereof for a current block is received. An area in a reference picture is then determined, where the reference picture corresponds to a previously coded picture. A matching result between a restricted reference template of a reference block and the current template is then determined, wherein the restricted reference template is generating by using only neighbouring reference pixels of a reference template inside the determined area, the refer- (Continued)

ence template has a same shape as the current template, and a location of the reference template is determined according to a target motion vector (MV) from the current template.

10 Claims, 5 Drawing Sheets

(51) Int. Cl.
*H04N 19/139* (2014.01)
*H04N 19/176* (2014.01)

(56) References Cited

U.S. PATENT DOCUMENTS

| | | |
|---|---|---|
| 11,659,198 B2 | 5/2023 | Chuang et al. |
| 2020/0154124 A1 | 5/2020 | Lee |
| 2020/0221097 A1 | 7/2020 | Laroche et al. |
| 2020/0236388 A1 | 7/2020 | Esenlik et al. |
| 2021/0084329 A1 | 3/2021 | Venugopal |
| 2021/0120262 A1 | 4/2021 | Chen et al. |
| 2021/0195227 A1* | 6/2021 | Lee .................. H04N 19/55 |

OTHER PUBLICATIONS

Chinese language office action dated Aug. 7, 2023, issued in application No. TW 111131310.
Chen, Y., et al.; "Description of Sdr, Hdr and 360° video coding technology proposal by Qualcomm and Technicolor—low and high complexity versions;" Joint Video Exploration Team (JVET) of ITU-T SG 16 WP 3 and ISO/IEC JTC 1/ SC 29/WG 11; Apr. 2018; pp. 1-43.
Park, N., et al.; "CE9-Related : Restricted template matching schemes to mitigate pipeline delay;" Joint Video Exploration Team (JVET) of ITU-T SG 16 WP 3 and ISO/IEC JTC 1/SC 29/WG 11; Jul. 2018; pp. 1-9.
EP Office Action dated Jun. 2, 2025 in European application No. 22857900.9-1207.
Hsu, C-W., et al.; "Description of SDR video coding technology proposal by MediaTek" (retrieved on Apr. 11, 2018).
Chen, C-C., et al.; "EE2-related: On spatial MV propagation and neighboring template block access for template matching and multi-pass DMVR" (retrieved on Jul. 1, 2021).

* cited by examiner

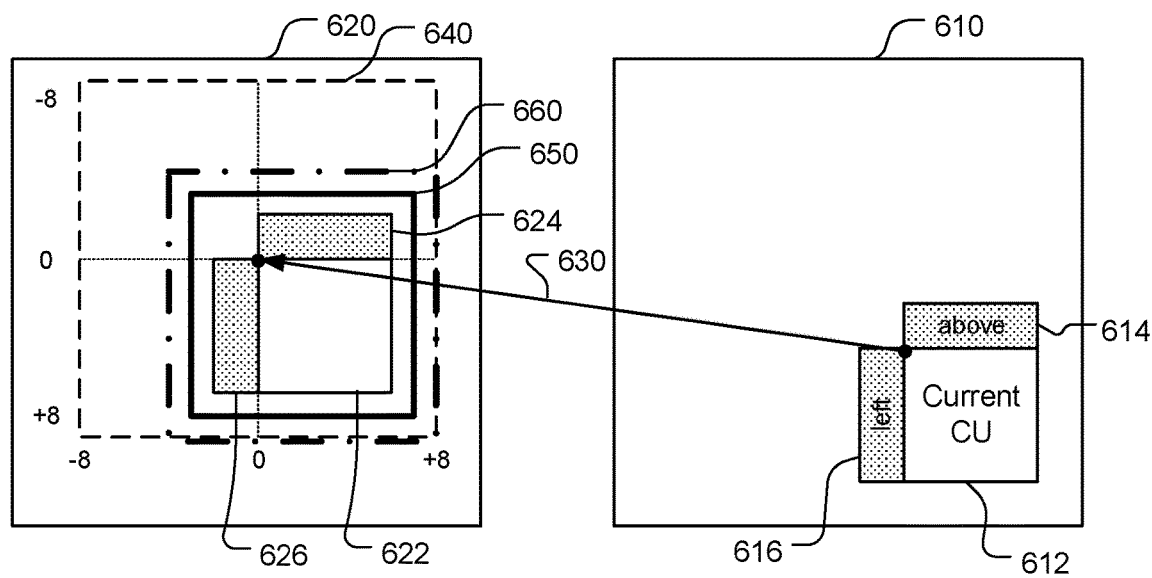
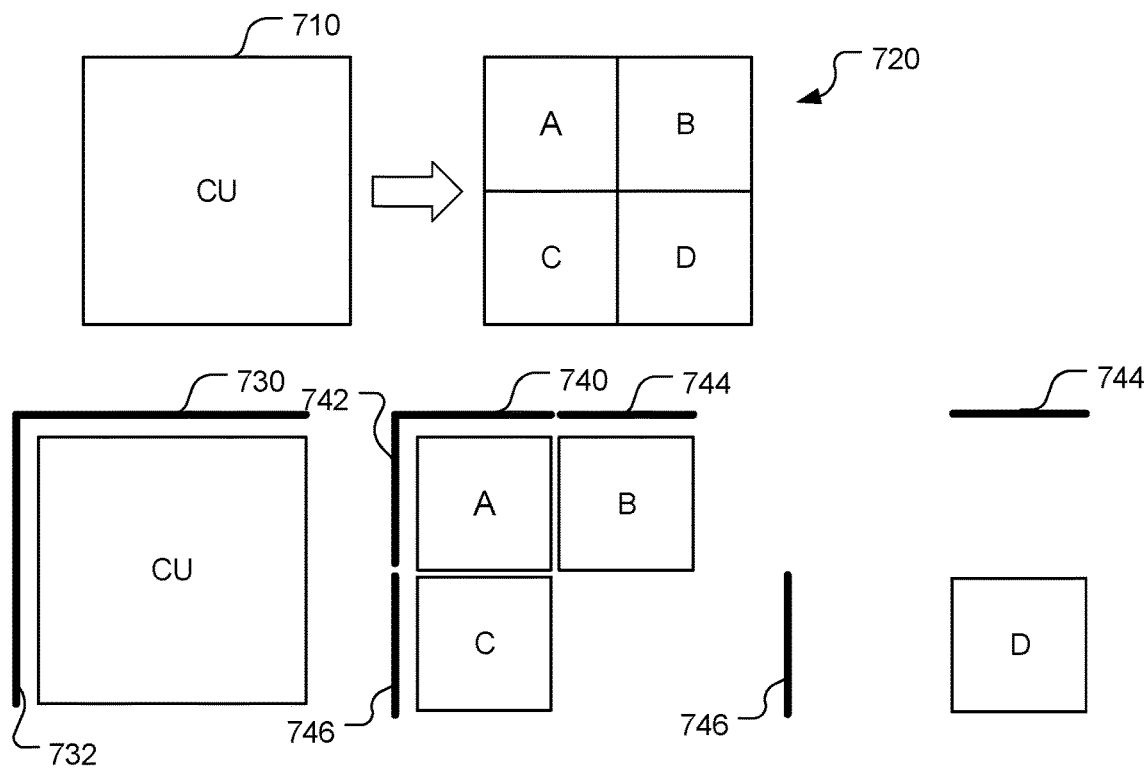
Fig. 6
Fig. 7

METHOD AND APPARATUS FOR HARDWARE-FRIENDLY TEMPLATE MATCHING IN VIDEO CODING SYSTEM

CROSS REFERENCE TO RELATED APPLICATIONS

The present invention is a non-Provisional Application of and claims priority to U.S. Provisional Patent Application No. 63/234,739, filed on Aug. 19, 2021. The U.S. Provisional Patent Application is hereby incorporated by reference in its entirety.

TECHNICAL FIELD

The present invention relates to video coding system. In particular, the present invention relates to efficient hardware implementation of template matching coding tool in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

A decoder corresponding to FIG. 1A is shown in FIG. 1B. The decoder can use similar or portion of the same functional blocks as the encoder except for Transform 118 and Quantization 120 since the decoder only needs Inverse Quantization 124 and Inverse Transform 126. Instead of Entropy Encoder 122, the decoder uses an entropy decoder 140 to decode the video bitstream into quantized transform coefficients and needed coding information (e.g., ILPF information, Intra prediction information and Inter prediction information). The Intra prediction 150 at the decoder side does not need to perform the mode search. Instead, the decoder only need to generate Intra prediction according to Intra prediction information received from the Entropy Decoder 140. Furthermore, for Inter prediction, the decoder only needs to perform motion compensation (MC 152) according to Intra prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Among various new coding tools, some have been adopted by the standard and some are not. Among the new coding tools, a technique, named Template Matching, to derive the motion vector (MV) for a current block is disclosed. The template matching is briefly reviewed as follows.

Template Matching (TM)

Template matching (TM) has been proposed in JVET-J0021 (Yi-Wen Chen, et al., "Description of SDR, HDR and 3600 video coding technology proposal by Qualcomm and Technicolor—low and high complexity versions", Joint Video Exploration Team (JVET) of ITU-T SG 16 WP 3 and ISO/IEC JTC 1/SC 29/WG 11, 10th Meeting: San Diego, US, 10-20 Apr. 2018, Document: JVET-J0021). Template Matching is a decoder-side MV derivation method to refine the motion information of the current CU by finding the closest match between a template (i.e., top and/or left neighbouring blocks of the current CU) in the current picture and a block in a reference picture as illustrated in FIG. 2. In FIG. 2, rows of pixels 214 above current block and columns of pixels 216 to the left of the current block 212 in the current picture 210 are selected as the template. The search starts from an initial position (as identified by the initial MV 230) in the reference picture. Corresponding rows of pixels 224 above the reference block 222 and columns of pixels 226 to the left of the reference block 222 in the reference picture 220 are identified as shown in FIG. 2. During the search, the same "L" shape reference pixels (i.e., 224 and 226) in different locations are compared with the corresponding pixels in the template around the current block. The location with minimum matching distortion is determined after the search. At this location, the block that has the optimal "L" shape pixels as its top and left neighbours (i.e., the smallest distortion) is selected as the reference block for the current block.

Since the template matching based refinement process is performed at both the encoder side and the decoder side, therefore the decoder can derive the MV without the need of signalled information from the encoder side. The Template Matching process derives motion information of the current block by finding the best match between a current template (top and/or left neighbouring blocks of the current block) in the current picture and a reference template (same size as the current template) in a reference picture within a local search region with search range [−8, 8] integer-pixel precision.

After the refined MV is determined, motion compensation is performed at the encoder side as well as the decoder side. A motion-compensated predictor (or a prediction block) is generated according to the refined MV, where some interpolation may be needed if the refined MV does not have an integer-pel value. The encoder will then use this motion-compensated predictor to generate a prediction residual block and the decoder use this motion-compensated predictor to generate a reconstructed block.

In AMVP (Advanced Motion Vector Prediction or Adaptive Motion Vector Prediction) mode, an MVP (Motion Vector Prediction) candidate is determined based on the template matching error to pick up the one which reaches the minimum difference between the current block and the reference block templates, and then TM performs only for this particular MVP candidate for MV refinement (i.e., local search around the initial MVP candidate). TM refines this MVP candidate, starting from full-pel MVD (Motion Vector Difference) precision (or 4-pel for 4-pel AMVR (Adaptive Motion Vector Resolution) mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 1. This search process ensures that the MVP candidate still keeps the same MV precision as indicated by AMVR mode after TM process.

TABLE 1

Search patterns of AMVR and merge mode with AMVR.

| Search pattern | AMVR mode | | | | Merge mode | |
| --- | --- | --- | --- | --- | --- | --- |
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| 1/8-pel cross | | | | | v | |

In the merge mode, a similar search method is applied to the merge candidate indicated by the merge index. As shown in Table 1, TM may be performed all the way down to the 1/8-pel MVD precision or skip those beyond the half-pel MVD precision, depending on whether the alternative interpolation filter (that is used when AMVR is of half-pel mode) is used (as indicated by AltIF) according to merged motion information. Besides, when TM mode is enabled, template matching may work as an independent process or an extra MV refinement process between block-based and subblock-based bilateral matching (BM) methods, depending on whether BM can be enabled or not according to its enabling condition check. When BM and TM are both enabled for a CU, the search process of TM stops at the half-pel MVD precision and the resulted MVs are further refined by using the same model-based MVD derivation method as in DMVR (Decoder-Side Motion Vector Refinement).

Basic Data Structure

In VVC, some new data structures are also introduced. Picture is partitioned into non-overlapped square coding tree units (CTUs). Each CTU contains one luma coding tree block (CTB) and two chroma CTBs. Each CTU can be treated as one or further partitioned into multiple coding units (CUs) using quadtree (QT) with nested multi-type tree (MTT). CU partition corresponds to a coding tree leaf node, where one CU contains one luma coding block (CB) and two chroma CBs in single tree (one coding tree for luma and chroma). One CB (Coding Block) contains one luma CB or two chroma CBs in a dual tree, i.e., chroma separate tree (CST) consisting of one coding tree for luma and another coding tree for chroma.

Except for some CU modes or sizes, CU is also used as the basic unit for prediction and transform. The max luma transform size is either 64 or 32. When the size of a current transform block (TB) is greater than the maximum transform size in width or height, the TB is inferred to be further split evenly in the horizontal or vertical direction. For example, when the maximum luma transform size is 64 and a luma CB with size is 128×128 luma CB, the luma CB is inferred to be partitioned into four 64×64 luma TBs.

Multi-type tree (MTT) include the following splits as shown in FIG. 3:
Horizontal binary tree (BT) split (310)
Vertical BT split (320)
Horizontal ternary tree (TT) split (330)
Vertical TT split (340)

Conceptually, starting from CTU, each coding tree node can be further split by a QT split or one of four MTT splits. If a QT split is applied to a parent node, QT, BT, and TT splits are allowed for its (two, three, or four in case of BT, TT, or QT applied to the parent) child nodes of the parent node. Once a MTT split is applied to a parent node, QT split is disabled for all its descendent nodes (with MTT depth >0), and only BT and TT are allowed for the descendent nodes.

Asymmetric Binary Tree Partitioning

Four new asymmetric binary tree splitting modes are suggested in JVET-V0083 (F. Le Léannec, et al., "EE2 related: asymmetric binary tree splitting on top of VVC", Joint Video Exploration Team (JVET) of ITU-T SG 16 WP 3 and ISO/IEC JTC 1/SC 29/WG 11, 22nd Meeting, by teleconference, 20-28 Apr. 2021, Document: JVET-V0083) and JVET-V0097 (Kai Zhang, et al., "AHG12: Unsymmetric partitioning methods in video coding", Joint Video Exploration Team (JVET) of ITU-T SG 16 WP 3 and ISO/IEC JTC 1/SC 29/WG 11, 22nd Meeting, by teleconference, 20-28 Apr. 2021, Document: JVET-V0097). It is proposed to add 4 asymmetric split modes to the multi-type tree structure of VVC, to allow new splitting configurations (i.e., UBT-H1 410, UBT-H2 420, UBT-V1 430 and UBT-V2 440). These added split modes are shown in FIG. 4.

UBT-H1 and UBT-H2 split a CU with dimension W×H into two child-CUs with dimensions {W×H/4, W×3H/4} and {W×3H/4, W×H/4}, respectively. UBT-V1 and UBT-V2 split a CU with dimension W×H into two child-CUs with dimensions {W/4×H, 3W/4×H} and {3W/4×H, W/4×H}, respectively. With UBT, the width or height of a CU or TU may be a non-dyadic number (not in a form of 2N). Some coding tools such as ISP (Intra Subpartition) mode, MIP (Matrix-based Intra Prediction) mode and SBT (Sub-block Transform) mode shall be disabled in those CUs (proposed in JVET-V0097). Besides, 6-point, 12-point, 24-point, and 48-point transforms/inverse-transforms shall be introduced to code residual blocks with non-dyadic dimensions.

Unsymmetrical Quaternary Tree (UQT) Partitioning

Four types of UQT (i.e., UQT-H1 510, UQT-H2 520, UQT-V1 530 and UQT-V2 540) are proposed in JVET-V0097 and shown in FIG. 5. UQT-H1 and UQT-H2 split a CU with dimension W×H into four child-CUs with dimensions {W×H/8, W×H/2, W×H/4, W×H/8} and {W×H/8, W×H/4, W×H/2, W×H/8}, respectively. UQT-V1 and UQT-V2 split a CU with dimension W×H into four child-CUs with dimensions {W/8×H, W/2×H, W/4×H, W/8×H} and {W/8×H, W/4×H, W/2×H, W/8×H}, respectively.

Bi-Prediction with CU-Level Weights (BCW)

BCW allows different weights for L0 reference picture list and L1 reference picture list in bi-prediction Bi-prediction is generated with one weighting parameter signalled for the coding unit, where $P_0$ corresponds to the prediction from L0 and $P_1$ corresponds to the prediction from L1, and w is the weighting factor:

$$P_{bi-pred} = ((8-w)*P_0 + w*P_1 + 4) \gg 3$$

Five w options for low delay pictures: {−2, 3, 4, 5, 10}.
Three w options for non-low-delay pictures: {3, 4, 5}.
The index of weight is explicitly signalled for inter mode.
For merge mode, the BCW index is inherited from the selected merging candidate or set to be the default value indicating the equal weight One SPS (Sequence Parameter Set) flag is used to indicate this tool is enabled or disabled:

sps_bcw_enabled_flag

The template matching search as mentioned above requires to access extra reference data to carry out the TM search. The reference data is often stored in an external memory such as DRAM (Dynamic Random Access Memory). Therefore, the TM search will result in system bandwidth increase. Also, the TM search and motion compensation will increase system complexity. It is desired to develop methods and apparatus to reduce the additional bandwidth and/or reduce computational complexity of the TM.

BRIEF SUMMARY

A method and apparatus for a video coding system that utilizes template matching with an area determined according to the present invention are disclosed. The video coding system may correspond to a video encoder or a video decoder. According to this method, input data associated with a current block of a video unit in a current picture are received. The current block may correspond to a CU. The video unit may correspond to a CTU. A current template for the current block is determined, where the current template comprises current neighbouring pixels on an above side of the current block, on a left side of the current block, or a combination thereof. An area in a reference picture is determined, where the reference picture corresponds to a previously coded picture. A matching result between a restricted reference template of a reference block and the current template is determined, where the restricted reference template is generating by using only neighbouring reference pixels of a reference template inside the area determined, the reference template has a same shape as the current template, and a location of the reference template is determined according to a target motion vector (MV) from the current template.

In one embodiment, the area determined is also applied to a motion compensation process to generate a prediction block using reference pixels of the reference picture indicated by a refined MV, and wherein the prediction block only uses the reference pixels in the area determined.

In one embodiment, the matching result is based on pixel-by-pixel differences between the reference template and the current template. In one embodiment, the step of determining matching result is performed for a plurality of target MVs including an initial MV, and the target MV that achieves a best matching is selected as a refined MV. A location of the area determined can be determined based on a current block MV.

In one embodiment, the area determined is equal to a motion compensation region of the current block for an initial MV. In another embodiment, the area determined is larger than a motion compensation region of the current block. Furthermore, the area determined can be larger than the motion compensation region of the current block by a pre-defined size.

In one embodiment, a padding technique is used to generate data for the neighbouring reference pixels outside the area determined. The padding technique may correspond to repetitive padding or mirrored padding.

In one embodiment, a partial matching result for a partial reference template is computed first and then the partial matching result is scaled to the matching result by normalizing the partial matching result according to a size of the partial reference template. For example, the partial reference template may correspond to the reference template inside the area determined.

In one embodiment, when the target MV is rounded to an integer MV and the reference template for the integer MV is inside the area determined, the reference template for the integer MV inside the area determined is used for said determining the matching result.

BRIEF DESCRIPTION OF THE DRAWINGS

FIG. 6. illustrates example of the bounding boxes according to embodiments of the present invention.

FIG. 7. illustrates example of sub-partition based template matching according to embodiments of the present invention.

DETAILED DESCRIPTION

Figure 1A:
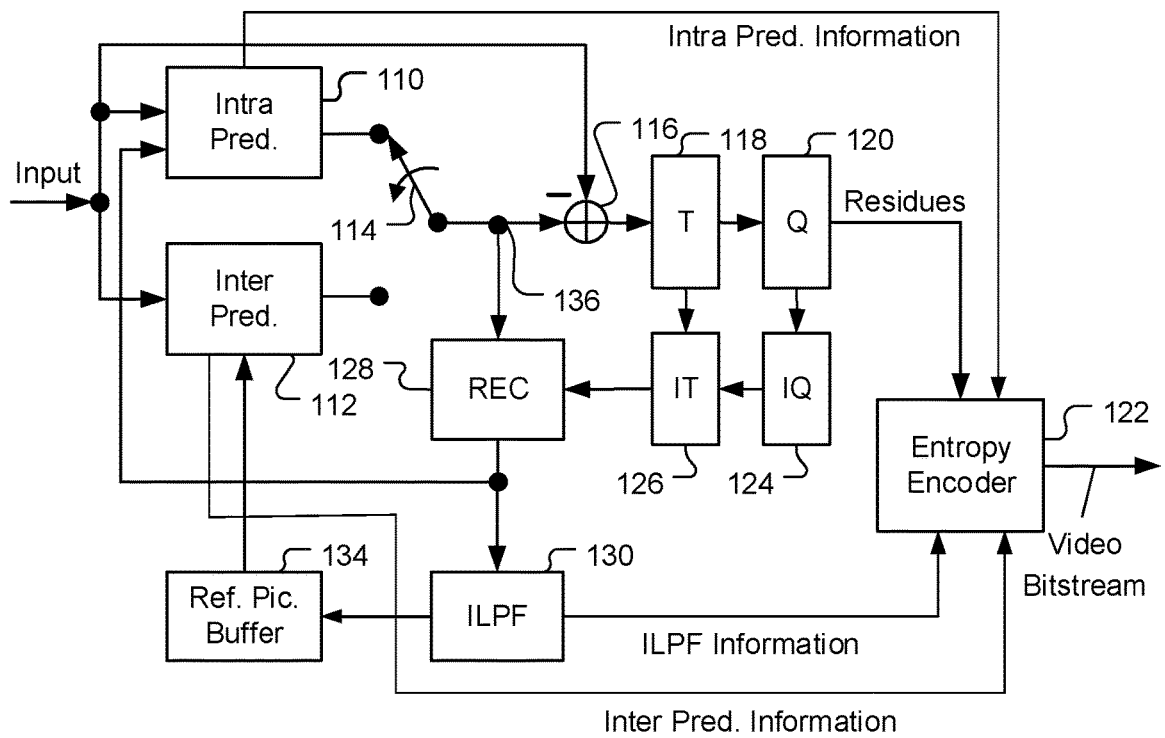
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

As mentioned earlier, the TM refinement process requires to access the reference data for the templates. Furthermore, the reference data for the templates has to be accessed multiple times from different locations during the refinement process. Therefore, the TM refinement process may consume a large amount memory bandwidth. In order to solve this issue, a bandwidth-restricted TM searching algorithm is disclosed as follow.

Bandwidth-Restricted TM Searching Technique

To reduce the external bandwidth of MC and TM search, a bandwidth-restricted TM searching method is proposed. An area (for example, a boundingBox) is defined for both the TM search and MC. The TM search area and MC filtering are all restricted inside the boundingBox according to the present invention. In this case, the reference data are restricted to be inside the bounding box for the TM search process as well as for the motion compensation (MC) process. Any reference data outside the bounding box will not be used for the TM search process nor for the MC process. The location of boundingBox can be based on the current MV and the location of boundingBox may correspond to the starting position (e.g., an upper-left corner location) of the boundingBox. In some other embodiments, the area defined for both the TM search and/or MC may be other shapes defined/determined based on the current MV, which should not be limited in this disclosure.

FIG. 6. illustrates example of the bounding boxes according to embodiments of the present invention. In FIG. 6, rows of pixels 614 above current block and columns of pixels 616 to the left of the current block 612 in the current picture 610 (only a partial picture area shown) are selected as the template. The search starts from an initial position (as identified by the initial MV 630) in the reference picture. Corresponding rows of pixels 624 above the reference block 622 and columns of pixels 626 to the left of the reference block 622 in the reference picture 620 (only a partial picture area shown) are identified as shown in FIG. 6. The [−8, +8]-pel search range 640 is indicated by a dashed square.

As shown in FIG. 6, the boundingBox can be equal to the MC region (marked with bold line 650) of the current CU for a given MV, such as an initial MV. The MC region (also referred to as the current CU's MC region) corresponds to an area of reference pixels required to perform motion compensation for the current CU with the given MV. In another embodiment, the boundingBox can be larger (e.g., a pre-defined size) than the current CU's MC region and the boundingBox according to this embodiment is shown as a dash-dot-line box 660 in FIG. 6.

There are several embodiments regarding how to deal with the required pixels for TM or MC outside the boundingBox. In one embodiment, the MC is not limited to TM's boundingBox. In other words, the MC process may use reference data outside the boundingBox. In another embodiment, the TM's boundingBox is constraining TM only, not constraining MC. In other words, the TM search can only use reference data in the boundingBox and the MC process may use reference data outside the boundingBox.

In the example of the boundingBox as shown in FIG. 6, we can reduce the TM search range from (−8; +8) to (−4; +4), and we use an initial MV to get the MC block (the block marked with bold line 650), the block 660 marked with dash-dot line adds a small area (for example, +/−1 or +/−2) around the block 650 marked with bold line. In one embodiment, templates and the final MC are generated by only using samples within the block 650 marked with bold line or within the block 660 marked with dash-dot line. For reference pixels outside any of these two blocks or both of the two blocks, data padding can be used to generate the needed reference pixels.

In one embodiment, when some pixels of the template required for the TM search are outside the bounding box, padded techniques can be used to generate the required pixels. In one embodiment, the padding corresponds to repetitive padding, where a same pixel value is repeated to generate the needed pixels. In another embodiment, mirrored padding is used, where padded pixels correspond to mirrored image of inside pixels across a boundary. In yet another embodiment, partial L-matching result is computed first and then scaling is used to compensate for the used area. For example, if only 50% of pixels are inside the boundingBox, the TM can use the available pixels to partially match with the current L-shape of the template, and then the computed matched cost is normalized according to the area used for the TM (in this example, need to multiply by a factor of 2).

In one embodiment, if rounding of the MV (e.g., rounding to the integer-pel precision) results in the L-shape template fitting completely inside the boundingBox, then the L-shape corresponding to the rounded MV is used. In one case, the left-most pixel column of the interpolation region (i.e, the region containing interpolated pixels for the L-shape template) is located outside of the boundingBox; if we round the initial MV to integer precision, then the integer-pixel L-shape template will be fully inside the boundingBox. In this case, the L-shape template corresponding to the integer-pel MV shall be used instead of the original L-shape template according to one embodiment.

Pre-Fetch Based TM Region

In order to reduce the latency of the TM process, a more aggressive pre-fetch method can be used. The assumption the pre-fetched TM reference data region to work is that in most videos, neighbouring CUs have very similar MVs and the MVs often follow a certain trend. This similarity can be used for the TM latency reduction. In one embodiment of the proposed method, one can define a bounding box for the TM search area and/or the final MC according to the decoded MV of the previous CU. Using the decoded MV of the previous CU, instead of the current one, makes it possible for earlier retrieval of the reference pixels from the external memory. The decoded MV of the previous CU can be the original MV (from the MV reconstruction stage), or the refined MV.

As one example, we can record previous CU's MV as (mvx, mvy), then we can define the boundingBox for the current CU as follows:

horizontal positions of the boundingBox end points:

$$CU\_x + mvx' - N1: CU\_x + CU\_width + mvx' + N2,$$

vertical positions of the boundingBox end point:

$$CU\_y + mvy' - N3: CU\_y + CU\_height + mvy' + N4.$$

Here mvx', mvy' can be corresponding to mvx, mvy respectively; N1~N4 are predefined constants used to define the bounding-box.

In one embodiment, if the TM searching and/or MC need to use pixels outside of the bounding-box, the TM searching and/or MC can use padded pixels or cancel the TM candidate.

In another embodiment, for the CU in the first CTU in a slice/tile, or for the first CU in the entire CTU row or for the first CU inside one CTU, the TM can be disabled to avoid the initial-latency of the first CU's TM. In another embodiment, a predefined MV (e.g., zero MV) is checked in this case. In another embodiment, the MV candidate from the history-based table (i.e., containing previously used MVs) is checked in this case.

Sub-Partition Based TM

In a real hardware decoder, if the TM is applied to a large CU (e.g. 128×128 CU), a hardware decoder may not be able to handle this case, because the internal SRAM for buffering the reference template will be too large. In the following, a method is proposed to make the hardware implementation easier.

In one embodiment, it is suggested to partition a large CU into several smaller CUs (e.g. 32×32) and perform the TM for each of the smaller CUs (e.g. 32×32) separately. Each sub-partition can use its top or left neighbour for the TM search. In some cases, the sub-partition may not have an adjacent neighbour such as the sub-partition "D" in FIG. 7. In FIG. 7, a CU 710 is partitioned into 4 smaller sub-partitions 720 (A, B, C and D). The horizontal neighbouring or vertical neighbouring pixels of the current large CU are indicated as 730 and 732 respectively. In this case, each sub-partition can use corresponding horizontal neighbouring or vertical neighbouring pixels of the current large CU (as shown in FIG. 7). For example, sub-partition A can use neighbouring pixels 740 and 742, sub-partition B can use neighbouring pixels 744 and 742, sub-partition C can use neighbouring pixels 740 and 746, and sub-partition D can use neighbouring pixels 744 and 746. Furthermore, for the internal block (i.e., sub-partition D in this case), one proposed method is to use the MV inheritance from the top/left/left-top blocks and use the "outside templates".

In another embodiment, the TM is performed only for a selected subset of smaller CUs (for example, only smaller CU A is selected in FIG. 7) and inherit the MV refinement for the rest smaller CUs (for example, inherit MV refinement for smaller CUs B, C, D in FIG. 7). In another embodiment, the MV refinement for the rest smaller CUs is defined based on the selected subset (e.g., as a linear combination or average of the select subset).

Signalling MVP Index

In this method, it is proposed to send one index to inform the decoder which merge candidate is to be refined. In JVET-U100 (Yao-Jen Chang, et al., "Compression efficiency methods beyond VVC", Joint Video Exploration Team (JVET) of ITU-T SG 16 WP 3 and ISO/IEC JTC 1/SC 29/WG 11, 21st Meeting, by teleconference, 6-15 Jan. 2021, Document: JVET-U0100), the method of using the TM to find the best candidate is disclosed. Therefore, the decoder needs to check a list of candidates, which may cause a large bandwidth and high complexity on the decoder side. In order to reduce the complexity and make the implementation of the TM at the decoder, we propose a method of reducing the decoder complexity by sending the index for the best candidate derived by the encoder to the decoder. As is known in the field, the index can be sent using a syntax. In this case, the decoder needs to refine only one candidate corresponding to the received index.

Simplified Integer Search for TM

In this proposed method, we incorporate the Error Surface method into the TM. The Error Surface method is an interpolation-based method to obtain the distortion result of a fractional search position based on two neighbouring integer search positions. Using the Error Surface method, there is no need to calculate the distortion for the fractional position TM match. Instead, the distortion is calculated for the integer-position TM, and the integer-position distortions are used to interpolate the distortion at the fractional positions.

According to one embodiment of the proposed method, we only search all the candidates at integer positions, and use the elements at the integer positions to form the TM template. After performing the TM search, we can derive the distortions at all (or partial) integer-pixel search positions. For deriving the fractional MV part, we just need to identify the integer-position distortions around the fractional position, and use Error Surface method to interpolate the new distortion at the fractional search position.

In another embodiment, we perform the integer pixel position search first, and then directly adjust the refined MV by the fractional MV part of the original MV. For example, an initial MV [3.75, −4.25] can be rounded to integer MV [4; −4] with the fractional MV part as [+0.25; +0.25]. After the TM refinement, the best integer MV found is [5, −6]. Therefore, the final MV becomes [4.75, −6.25] by modifying the best integer MV according to [−0.25; −0.25].

Adaptive Search Range

In this proposed method, the SR (Search Range) depends on some conditions of the current CU.

In one embodiment, if the current CU's MV is more diverse in the vertical direction (i.e., the differences of the MVs in the vertical direction being large), then we assign the SR for the horizontal direction to be lower than the vertical direction. In another embodiment, if the current CU's MV is less diverse in the vertical direction (i.e., the differences of the MVs in the vertical direction being small), then we assign the SR for the horizontal-direction to be larger than the vertical direction.

In another embodiment, if the current CU's MV is more diverse in horizontal direction (i.e., the differences of the MVs in the horizontal direction being large), then we assign SR for the vertical direction to be lower than the horizontal direction. In another embodiment, if the current CU's MV is less diverse in the horizontal direction (i.e., the differences of the MVs in the horizontal direction being small), then we assign the SR for the vertical direction to be larger than the horizontal direction.

In one embodiment, if the surrounding CU's (e.g. above, left, above-left, etc.) MV is more diverse in the vertical direction, then we assign the SR for the horizontal-direction to be lower than the vertical direction (or, in another embodiment, the situation is reversed).

For another embodiment, if the surrounding CU's (e.g. above, left, above-left, etc.) MV is more diverse in the horizontal direction, then we assign the SR for the vertical-direction to be lower than the horizontal direction (or, in another embodiment, the situation is reversed).

In another embodiment, the SR of larger CU will be larger.

In another embodiment, the SR of the current CU may depend on the search result of the neighbouring CU. For example, if the top/left neighbour TM mode shows a large MVD after searching, the current CU's SR may be increased.

In another embodiment, if the reference picture is farther (in terms of the POC (Picture Order Count) distance of the reference picture with the current picture) from the current picture, the SR will be increased.

Constraining TM Candidate by POC Distance

In the proposed method, it is suggested to disable the TM search for some reference pictures with the POC (Picture Order Count) distance larger than a threshold. In one embodiment, some syntax elements can be included in the picture header or slice header to inform the decoder regarding which reference picture will be disabled for the TM searching. When the reference index of the current CU's MV matches the prohibited picture, it implicitly turns off the TM search for the current MV. In another embodiment, the predefined threshold for the POC distance can be signalled in the header element (e.g., in the slice header or picture header or tile header or sequence header), and the decoder will compute the POC distance (i.e., the POC distance between the current CU and the reference picture), if the POC distance is larger than the predefined threshold, the TM mode will be implicitly turned off.

Figure 1B:
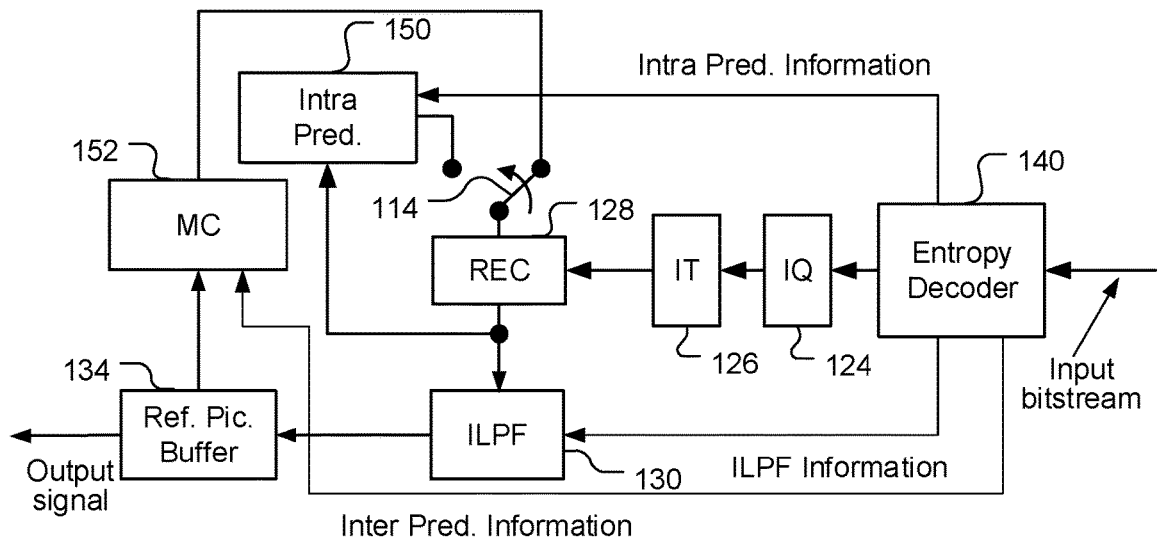
FIG. 1B illustrates a corresponding decoder for the encoder in FIG. 1A.
Figure 2:
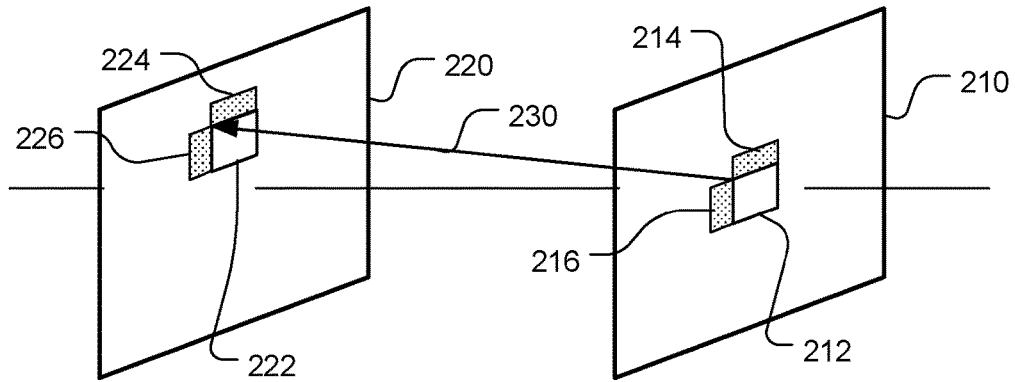
FIG. 2 illustrates an example of template matching, where rows of pixels above the current block and the reference block and columns of pixels to the left of the current block and the reference block are selected as the templates.
Figure 3:
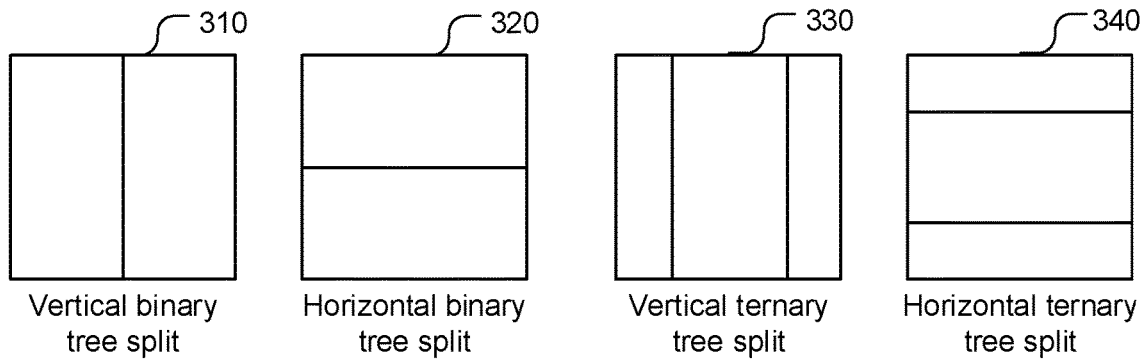
FIG. 3 illustrates multi-type tree (MTT) splits including horizontal binary tree, vertical binary tree, horizontal ternary tree, and vertical ternary tree.
Figure 4:
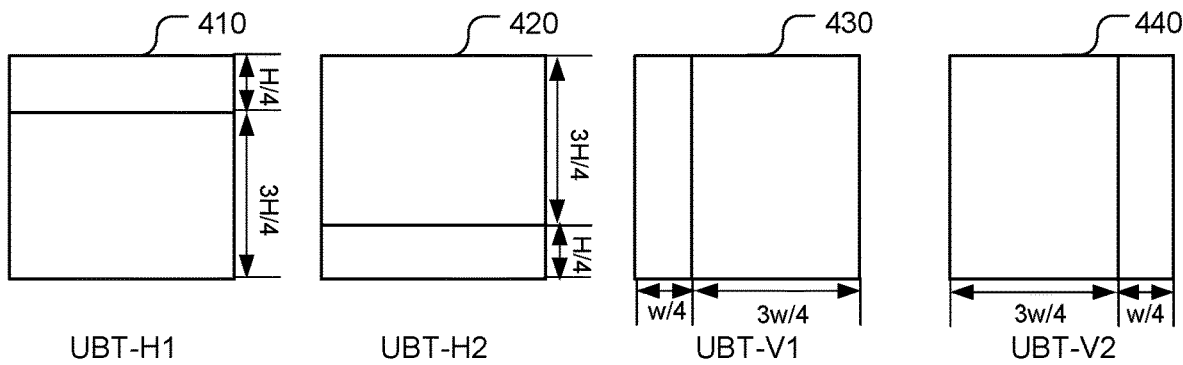
FIG. 4 illustrates a new type of partitioning—asymmetric binary tree partitioning.
Figure 5:
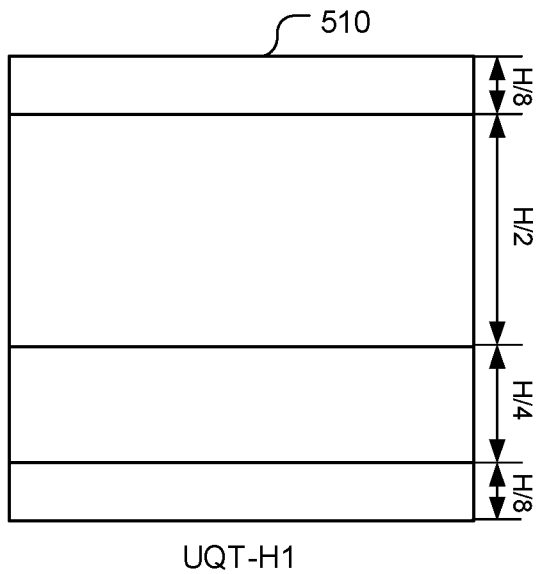
FIG. 5 illustrates yet another new type of partitioning—unsymmetrical quaternary tree partitioning.
Figure 5:
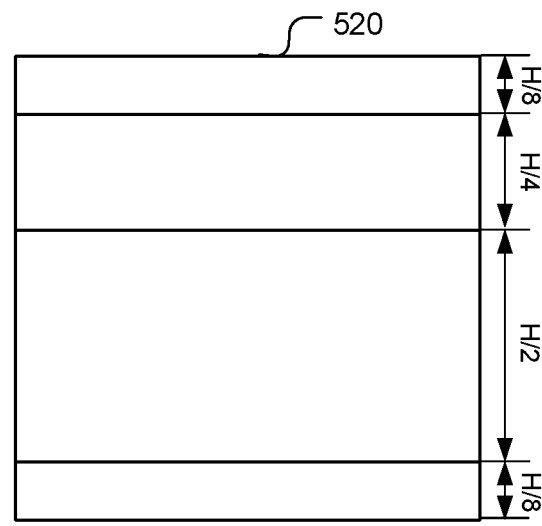
Figure 5:
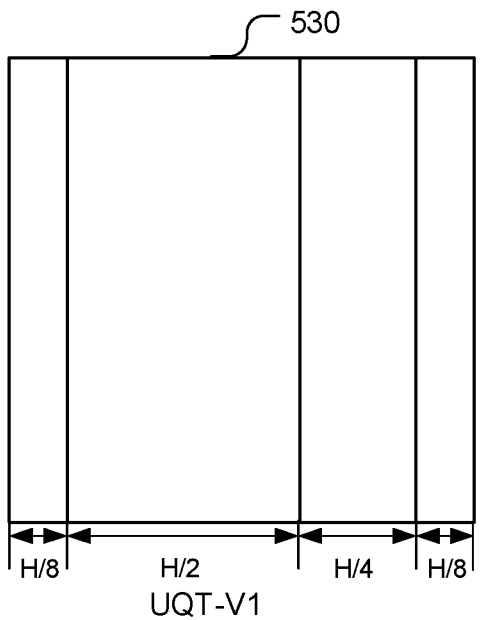
Figure 5:
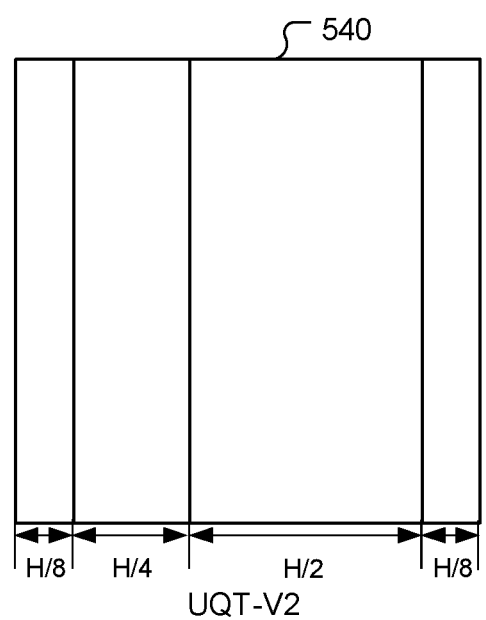

The template matching can be used as an inter prediction technique to derive the MV. The template matching can also be used to refine an initial MV. Therefore, template matching process is considered as a part of inter prediction. Therefore, the foregoing proposed methods related to template matching can be implemented in the encoders and/or the decoders. For example, the proposed method can be implemented in an inter coding module (e.g., Inter-Pred. 112 in FIG. 1A) of an encoder, and/or an inter coding module (e.g., MC 152 in FIG. 1B) of a decoder.

Figure 8:
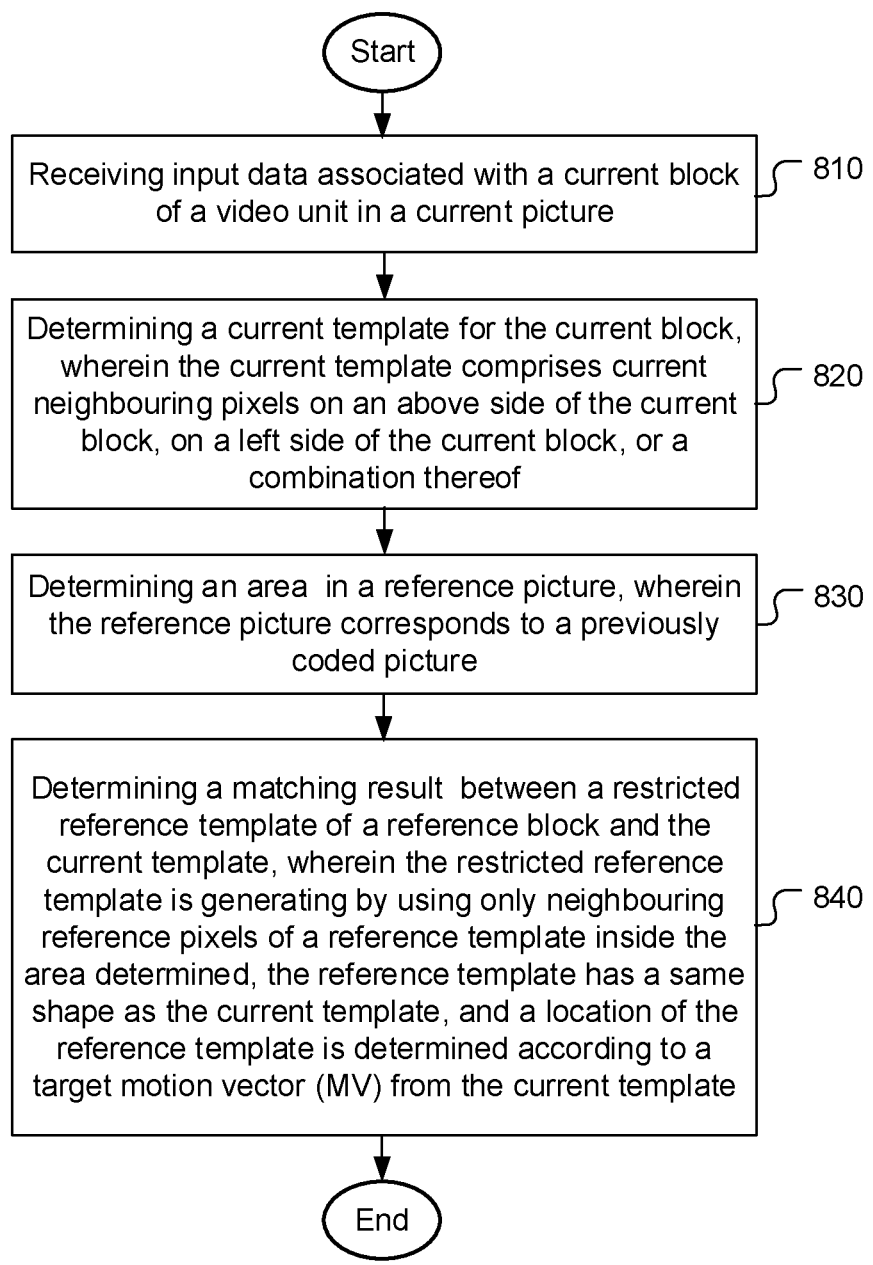
FIG. 8 illustrates a flowchart of an exemplary video coding system that utilizes template matching with a bounding box according to an embodiment of the present invention.

FIG. 8 illustrates a flowchart of an exemplary video coding system that utilizes template matching with an area determined according to an embodiment of the present invention. The video coding system may correspond to a video encoder or a video decoder. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current block of a video unit in a current picture are received in step 810. The current block may correspond to a CU. The video unit may correspond to a CTU. A current template for the current block is determined in step 820, where the current template comprises current neighbouring pixels on an above side of the current block, on a left side of the current block, or a combination thereof. An area in a reference picture is determined in step 830, where the reference picture corresponds to a previously coded picture. A matching result between a restricted reference template of a reference block and the current template is determined in step 840, where the restricted reference template is generating by using only neighbouring reference pixels of a reference template inside the area determined, the reference template has a same shape as the current template, and a location of the reference template is determined according to a target motion vector (MV) from the current template.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
   receiving input data associated with a current block of a video unit in a current picture;
   determining a current template for the current block, wherein the current template comprises current neighbouring pixels on an above side of the current block, on a left side of the current block, or a combination thereof;
   determining an area in a reference picture, wherein the reference picture corresponds to a previously coded picture; and
   determining a matching result between a restricted reference template of a reference block and the current template, wherein the restricted reference template is generating by using only neighbouring reference pixels of a reference template inside the area determined, the reference template has a same shape as the current template, and a location of the reference template is determined according to a target motion vector (MV) from the current template.

2. The method of claim 1, wherein the area determined is also applied to a motion compensation process to generate a prediction block using reference pixels of the reference picture indicated by a refined MV, and wherein the prediction block only uses the reference pixels in the area determined.

3. The method of claim 1, wherein said determining the matching result is performed for a plurality of target MVs including an initial MV, and the target MV that achieves a best matching is selected as a refined MV.

4. The method of claim 3, wherein a location of the area determined is determined based on a current block MV.

5. The method of claim 1, wherein the area determined is equal to a motion compensation region of the current block for an initial MV.

6. The method of claim 1, wherein the area determined is larger than a motion compensation region of the current block.

7. The method of claim 6, wherein the area determined is larger than the motion compensation region of the current block by a pre-defined size.

8. The method of claim 1, wherein a padding technique is used to generate data for the neighbouring reference pixels outside the area determined.

9. The method of claim 8, wherein the padding technique corresponds to repetitive padding or mirrored padding.

10. An apparatus of video coding, the apparatus comprising one or more electronic circuits or processors arranged to:
   receive input data associated with a current block of a video unit in a current picture;
   determine a current template for the current block, wherein the current template comprises current neighbouring pixels on an above side of the current block, on a left side of the current block, or a combination thereof;
   determine an area in a reference picture, wherein the reference picture corresponds to a previously coded picture; and
   determine a matching result between a restricted reference template of a reference block and the current template, wherein the restricted reference template is generating by using only neighbouring reference pixels of a reference template inside the area determined, the reference template has a same shape as the current template, and a location of the reference template is determined according to a target motion vector (MV) from the current template.

* * * * *